United States Patent [19]

Leach et al.

[11] Patent Number: 5,470,609
[45] Date of Patent: Nov. 28, 1995

[54] REPAIR OF PLASTIC SUBSTRATES UTILIZING POWDER COATING COMPOSITIONS

[75] Inventors: Burr L. Leach, Marion; David Hawkins, Van Buren, both of Ind.

[73] Assignee: GenCorp Inc., Fairlawn, Ohio

[21] Appl. No.: 987,507

[22] Filed: Dec. 7, 1992

[51] Int. Cl.⁶ .................................................. B32B 35/00
[52] U.S. Cl. ...................... 427/140; 427/195; 427/197; 427/198; 427/264; 427/269; 427/275; 427/289; 427/290; 427/316; 427/371; 427/393.5
[58] Field of Search ................................. 427/140, 385.5, 427/393.5, 316, 195, 290, 289, 197, 275, 198, 264, 369, 371

[56] References Cited

U.S. PATENT DOCUMENTS

| | | | |
|---|---|---|---|
| 2,770,556 | 11/1956 | Grangaard et al. | 427/140 |
| 3,814,645 | 6/1974 | Fletcher et al. | 156/94 |
| 4,239,808 | 12/1980 | Arnason | 428/482 |
| 4,260,439 | 4/1981 | Speer | 427/140 |
| 4,409,270 | 10/1983 | Faber et al. | 428/63 |
| 4,510,001 | 4/1985 | Speer | 427/140 |
| 4,659,589 | 4/1987 | Jimenez | 427/140 |
| 5,021,297 | 6/1991 | Rhue et al. | 428/430 |
| 5,194,293 | 3/1993 | Foster | 427/140 |

FOREIGN PATENT DOCUMENTS 2042930  10/1980  United Kingdom .

*Primary Examiner*—Janyce Bell
*Attorney, Agent, or Firm*—Robert F. Rywalski; Daniel J. Hudak

[57] ABSTRACT

A process for repairing surface defects in plastic articles, especially plastic articles formed from fiber reinforced thermosetting resins, includes the steps of applying a powder coating composition to a defective area on the surface of a plastic article, curing the applied powder coating composition through the application of heat, and removing excess cured powder coating composition from the area of the defect to conform the area of the defect to the proper contours of the plastic article. The process can be utilized for repairing surface defects such as porosity, scratches, gouges and sand-through areas of cured thermoset substrates such as automotive body panels formed from sheet or bulk molding compounds.

18 Claims, No Drawings

REPAIR OF PLASTIC SUBSTRATES UTILIZING POWDER COATING COMPOSITIONS

FIELD OF THE INVENTION

The invention relates to a process for repairing plastic molded articles using powder coating compositions, and more particularly, to a process for repairing surface defects in heat cured molded articles formed from bulk molding compound (BMC) or sheet molding compound (SMC) by utilizing various conventional powder coating compositions.

BACKGROUND

During the molding and subsequent handling of large plastic articles, such as automotive body panels, various minor surface defects such as porosity, scratches, gouges and sand-throughs can be formed due to minor departures from optimum operating conditions or procedures. Sand-throughs can occur by sanding through the smooth exterior surface of the molded body panel when attempting to effect cosmetic repairs such as removal of adhesives or bumps. Such defects can arise, for example from dirt or debris inadvertently entering the mold before or with the mold charge, or from a variety of other reasons. Also, small dents, scratches or other surface blemishes can also arise while removing the article from the mold or during subsequent handling. Often such minor defects or blemishes do not adversely affect the structural or functional characteristics of the molded article but impart an unacceptable appearance which cannot be effectively corrected with normal finishing operations such as painting.

Because large molded articles formed from thermosetting SMC and BMC are relatively expensive to produce, a method for quickly, easily and inexpensively repairing minor defects which mar the appearance of otherwise usable molded articles would be highly desirable.

U.S. Pat. No. 4,409,270 to Faber et al. discloses a method for repairing a surface defect in a thermoset fiberglass reinforced polyester or vinyl ester resin. In accordance with the teachings of Faber et al., an excess amount of a thermosetting repair material is used to fill a defect in the surface of a thermoset substrate. Sufficient amounts of heat and pressure are applied to the repair material for a time sufficient to cure the repair material. After curing, the part is allowed to cool and then the part is finished by removing excess repair material to return the part to its original contour. The method is relatively time consuming and cumbersome requiring the application of a liquid repair material and the simultaneous application of heat and pressure for periods of time up to about 20 minutes.

U.S. Pat. No. 5,021,297 to Rhue et al. discloses a method of coating a fiber reinforced plastic substrate with a powder coating composition to seal the substrate against gassing. The teachings of Rhue et al. relates to a routine procedure which is used to remedy appearance problems associated with the eruption of volatile materials during the cure which cause pores in the surface. The teachings of Rhue et al., however, do not relate to, nor do they suggest, a method by which spot repairs can be made as required to correct for scratches gouges, sand-through and other defects.

SUMMARY OF THE INVENTION

The invention provides a simple, inexpensive process for effecting spot repairs of defects in plastic molded articles. The process is particularly well suited for repairing surface defects such as porosity, scratches, gouges and sand-throughs of cured thermoset substrates formed from SMC and BMC, especially in-mold coated or powder coated substrates.

In accordance with the invention, the plastic substrate is prepared for application of a powder coating composition by smoothing the surface of the substrate in the area of the defect. The smoothed area of the defect is then heated to a temperature in excess of that sufficient to cure a subsequently applied powder coating composition. A powder coating composition is then applied to the area of the defect in an amount and to a thickness sufficient to fill any portion of the defect which is below the normal surface contour of the plastic substrate so that upon subsequent removal of excess cured powder coating the plastic substrate assumes its proper contour conforming to the shape of the mold cavity. The powder coating composition can be applied to the substrate while heat is also being applied, but preferably application of heat to the substrate is suspended while the powder coating composition is quickly applied to the substrate over a period of time sufficiently short to prevent the defective area from cooling to a temperature below the cure temperature of the powder coating composition. After the powder coating composition has been applied to the defective area of the plastic substrate, sufficient amount of heat is continuously applied to the defective area to which the powder coating composition has been applied to maintain sufficient temperature for an amount of time sufficient to effect curing of the powder coating composition. After the powder coating composition applied to the defect area of the substrate has cured, the substrate is allowed to cool and then excess cured powder coating composition is removed and the area of the defect is smoothed to conform the article to its proper contours. Plastic articles having minor surface defects which are cosmetically repaired in accordance with the process of the invention can be finished in accordance with normal production specifications by applying paint or other finish coating to provide finished articles having an excellent appearance which is substantially indistinguishable from that of similar finished articles which were free of defects throughout the production process.

The process in accordance with the invention provides a simple inexpensive method, generally only requiring a few hand held tools, for quickly effecting repairs to minor surface defects in plastic molded articles to provide finished articles having an excellent appearance which meets the strict quality specifications generally imposed on such articles, and thereby improving product quality and production throughput while reducing waste.

DETAILED DESCRIPTION

In accordance with the invention, a process for repairing surface defects on plastic articles is provided. The method is generally applicable to plastic articles formed from thermosetting resins, such as polyesters, epoxies, phenolics, urea-formaldehydes, and the like which are either non-reinforced or fiber reinforced, and is particularly well suited for repairing surface defects on articles formed from typical SMC or BMC which generally comprise a mixture of thermosetting resins and fibers. The process of the invention may, however, be used advantageously to repair surface defects in various other plastic articles, including articles formed from various thermosetting or thermoplastic materials such as polymers and copolymers of silicones, aminoplasts, polyurethane, polystyrene, polypropylene, acrylics, polyvinyl chloride, acrylonitrile, conjugated dienes, and mixtures and blends thereof.

Various conventional powder coating compositions, such as thermosetting epoxy resin powder coating compositions based on epoxy group-containing acrylic polymers and polyacid curing agents, thermosetting polyester powder coating compositions, thermosetting acrylic powder coating compositions can be utilized in practicing the invention.

Examples of thermosetting epoxy resin powder coating compositions are those based on epoxy group-containing acrylic polymers and polyacid curing agents. These powder coating compositions are preferred because they provide the best coating appearance and reduced popping.

Examples of polyacid curing agents are saturated aliphatic dicarboxylic acids containing from 4 to 24 carbon atoms. Specific examples of these powder coating compositions are disclosed in U.S. Pat. No. Re. 32,251.

Examples of thermosetting polyester powder coating compositions are acid group-containing polyesters in combination with triglycidyl isocyanurate curing agents. These products are commercially available. For example, the carboxylic acid group-containing polyesters are available from Ciba-Geigy as ARALDITE 3010 and 3001 and from Dutch State Mines as URA-LAC P3600. Triglycidyl isocyanurate curing agent is available from Ciba-Geigy as PT810.

Examples of thermosetting acrylic powder coating compositions are acid group-containing acrylic polymers in combination with an aliphatic dicarboxylic acid containing from 4 to 20 carbon atoms per molecule and/or a polymeric polyanhydride and a beta-hydroxyalkylamide crosslinking agent. Specific examples of these powder coating compositions are described in U.S. Pat. No. 4,727,111.

A particularly preferred thermosetting powder coating composition for smoothness and reduced popping is one based on an epoxy group-containing acrylic polymer and a polyol-modified polyanhydride curing agent such as poly-(dodecanedioic) anhydride reacted with trimethylolpropane in an OH/anhydride equivalent ratio of 0.3 to 0.6/1. Such a product contains a mixture of carboxylic acid groups and anhydride groups. Such powder coating compositions are described in U.S. Pat. No. 5,021,297.

Besides the main resinous film-forming ingredients in the powder coating composition described above, the powder coating composition contains other optional ingredients well known in the art of powder coating compositions. Examples of these other ingredients are pigments, flow control agents, UV absorbing agents and anti-oxidants. These optional ingredients are described in U.S. Pat. No. 4,727,111 mentioned above.

In addition, the powder coating composition may include fumed silica or the like as a powder flow additive to reduce caking of the powder during storage. An example of fumed silica is sold by Cabot Corporate under the trademark CAB-O-SIL®. The powder flow additive when used is generally present in amounts ranging from about 0.1 to about 0.5 percent by weight based on the total weight of the powder coating composition. The powder flow additive is generally added to the particulate powder coating composition after preparation of the particulate mixture.

The powder coating compositions are prepared by melt blending the various ingredients. This can be accomplished by first blending in a high shear or high intensity dry mixer, e.g., a Welex mixer, and then melt blending the mixture in an extruder at a temperature of from about 80° C to about 130° C. The extrudate is then cooled and pulverized into a powder.

The process of the invention involves the steps of applying the powder coating composition to a defective area of a plastic substrate, curing the applied powder coating composition through the application of heat, and removing excess cured powder coating composition to conform the area of the defect to the proper contours of the plastic substrate.

To prepare the defect for application of the powder coating composition, it is generally preferable to first smooth the surface of the plastic article in the area of the substrate to eliminate any rough or jagged features. By providing a smooth surface along which the powder coating composition can be applied and bonded to, the possibility of voids forming at the interface between the substrate and the powder coating composition during cure is substantially reduced, thereby reducing the possibility of bumps or unevenness in the repaired surface. The area of the defect can be smoothed by abrasion such as by sanding the surface by hand or with a power sander such as an orbital power sander. Suitable results can be obtained by smoothing the area of the defect using a medium grit, such as 220 grit, sandpaper.

Before applying the powder coating composition, it is recommended that the area of the defect to which the powder coating composition is to be applied be preheated to a temperature sufficiently in excess of the curing temperature of the powder coating composition so that the powder coating composition is quickly heated by the substrate to a temperature above its cure temperature and remains above the cure temperature throughout the application of the powder coating composition to the substrate. A generally acceptable temperature to which the area of the defect should be preheated before application of the powder coating composition is in the range from about 250° F. (121° C.) to about 375° F. (191° C.) and preferably about 350° F. (about 175° C.). The temperature of the area of the defect can be easily determined using any of various commercially available infrared temperature measuring devices. The area of the defect can be suitable preheated using various conventional heating means such as infrared lamps or heat guns, with commercially available heat guns capable of delivering a stream of air at a temperature of about 1000° F. (about 540° C.) to about 1400° F. (about 760° C.) being preferred.

After the area of the defect has been preheated, powder coating composition is immediately applied to the area of the defect in an amount which is preferably slightly in excess of that needed to fill in the defect so that after the powder coating composition has cured excess cured powder coating composition can be removed such as through abrasion to conform the surface of the plastic substrate to its proper contours. While this is generally not a problem, it is recommended that the powder coating composition be applied quickly enough so that the preheated area of the defect does not cool to a temperature below the cure temperature of the powder coating composition. Generally, it is desirable that the heated area of the defect be maintained at a temperature of at least about 300° F. (about 150° C.) during application of the powder coating composition to the area of the defect and thereafter until the powder coating composition has cured. The powder coating compositions can be applied to the plastic substrate in the area of the defect by any of the various known powder coating techniques, such as commercially available powder guns or powder spraying equipment designed for the application of powder coating compositions. The powder coating compositions can be applied to the substrate in thicknesses ranging from about 1 mil (25 μm) to about 6 mils (150 μm). For defects which require more than 6 mils of material for repair, it is possible to build up layers of the powder coating composition through successive application and curing steps until the required thickness is achieved.

After the powder coating composition is applied to the area of the defect, it is then necessary to maintain the applied powder coating composition at a temperature above its curing temperature for an amount of time sufficient to cure the powder coating composition. The specific curing times and temperatures depend on the particular powder coating composition utilized. Curing temperatures are generally at least 250° F. (121° C.), usually 250° F. (121° C.) to 325° F. (163° C.) and preferably from about 275° F. (135° C.) to about 325° F. (163° C.). The amount of time needed to cure the powder coating compositions is generally from about 15 minutes up to about 1 hour. The applied powder coating compositions should be maintained within the required temperature range throughout the curing step by either continuous or intermittent application of heat as needed. As with the preheating step, heat can be applied using various conventional heating means, preferably a hot air gun, and the temperature can be monitored with an infrared temperature measuring device.

After the powder coating composition applied to the defect has cured, it is generally allowed to cool, preferably to about room temperature, before excess cured powder coating composition is removed to conform the substrate to its proper contour. Excess cured powder coating composition can be removed with grinders, cutters, or the like, but the substrate is preferably sanded in the area of the repair to obtain a smooth, high quality surface conforming to the desired contours of the plastic article. An acceptably smooth surface can be obtained using a fine grit, such as a 320 grit, sandpaper. In addition, standard buffing or standard finishing operations can be utilized if desired to obtain a very smooth surface. The repaired article can be painted, coated, or otherwise finished in accordance with the required production specifications to provide a finished article of comparable quality to that of an article produced from a molded plastic free of surface defects.

While in accordance with the Patent Statutes, the best mode and preferred embodiment has been set forth, the scope of the invention is not limited thereto, but rather by the scope of the attached claims.

What is claimed is:

1. A process for repairing a surface defect in a plastic article molded in a mold cavity, comprising:
    applying a thermosettable powder coating composition to an area of a plastic article, which area includes a surface defect,
    curing the applied powder coating composition through the application of heat,
    and removing excess cured powder coating composition from said area to which said powder coating composition was applied and cured to conform said area to the shape of the mold cavity used to form the molded plastic article.

2. A process in accordance with claim 1, wherein the plastic article is formed from a thermosettable polymeric material.

3. A process in accordance with claim 1, wherein the plastic article is formed from a fiber reinforced thermosettable polyester, epoxy, or phenolic resin.

4. A process in accordance with claim 1, wherein the powder coating composition contains a thermosettable polyester, epoxy, or acrylic resin.

5. A process in accordance with claim 1, further comprising preheating the area which includes a surface defect to a temperature above the cure temperature of the powder coating composition before applying the powder coating composition thereto.

6. A process in accordance with claim 5, wherein the area which includes a surface defect is preheated to a temperature in the range from about 250° F. to about 325° F.

7. A process in accordance with claim 1, wherein the step of curing includes maintaining the applied powder coating composition at a temperature and for a period of time sufficient to cause curing of the applied powder coating composition.

8. A process in accordance with claim 1, wherein the step of removing excess cured powder coating composition includes sanding the area to which said powder coating was applied and cured.

9. A process for repairing a surface defect in a plastic article formed from a fiber reinforced thermosetting resin, comprising:
    smoothing an area of a plastic article, which area includes a surface defect, to remove rough and jagged features,
    preheating said area which includes a surface defect to a temperature above the cure temperature of a subsequently applied powder coating composition,
    applying a thermosettable powder coating composition to the heated area which includes a surface defect,
    curing the applied powder composition by applying heat to maintain the powder coating composition at temperature and for a period of time sufficient to cause curing of the applied powder coating composition,
    allowing the cured powder coating composition to cool to about room temperature, and
    removing excess cured powder coating composition from the area to which said powder coating was applied and cured to conform the area of the defect to the shape of the mold cavity used to form the molded plastic article.

10. A process in accordance with claim 9, wherein said area which includes a surface defect is preheated to a temperature in the range from about 250° F. to about 325° F.

11. A process in accordance with claim 10, wherein said area which includes a surface defect remains at a temperature in the range between about 250° F. and about 325° F. during application of, and during the subsequent curing of the powder coating composition.

12. A process in accordance with claim 11, wherein the applied powder coating composition is maintained at a temperature of between about 250° F. and about 325° F. for a period of about 15 minutes to about 1 hour.

13. A process in accordance with claim 12, wherein the step of removing excess cured powder coating composition includes sanding said area to which said powder coating was applied and cured.

14. A process for repairing a surface defect in a plastic article molded in a mold cavity, comprising:
    smoothing an area of the plastic article, which area includes a surface defect, to remove rough and jagged features,
    preheating said area to a temperature above the cure temperature of a subsequently applied powder coating composition,
    applying a thermosettable powder coating composition to said preheated area,
    curing said applied powder coating composition through the application of heat, and removing excess cured powder coating composition from said area to which said powder coating composition was applied and cured to conform said area to the shape of the mold cavity used to form the molded plastic article.

15. A process according to claim 14, wherein the plastic article is a thermoset polymeric material.

16. A process according to claim 15, wherein said thermoset polymeric material is formed from a fiber reinforced thermosettable polyester, epoxy, or phenolic resin.

17. A process according to claim 16, wherein said powder coating composition contains a thermosettable polyester, epoxy, or acrylic resin.

18. A process according to claim 17, wherein said preheating temperature is from about 250° F. to about 325° F. and including maintaining said applied powder coating composition at said temperature for a period of time sufficient to cause curing of said powder coating composition.

* * * * *